United States Patent [19]

Langan

[11] 4,149,037
[45] Apr. 10, 1979

[54] HIGH COMMON MODE RELAY MULTIPLEXER

[75] Inventor: Marion J. Langan, Huntsville, Ala.

[73] Assignee: Avco Corporation, Greenwich, Conn.

[21] Appl. No.: 880,512

[22] Filed: Feb. 23, 1978

[51] Int. Cl.² ............................................. H04J 3/04
[52] U.S. Cl. ............................. 179/15 BL; 179/15 A
[58] Field of Search ........... 179/15 BL, 15 A, 18 GE, 179/15 R; 178/50, 58 R; 340/182, 183, 184; 325/42

[56] References Cited

U.S. PATENT DOCUMENTS

| | | | |
|---|---|---|---|
| 3,249,883 | 5/1966 | Berneike et al. | 179/15 BL |
| 3,346,698 | 10/1967 | Bradford | 179/15 BL |
| 3,598,922 | 8/1971 | Ainsworth | 179/15 BL |
| 3,935,385 | 1/1976 | Thun | 179/15 A |

Primary Examiner—Thomas A. Robinson
Attorney, Agent, or Firm—Irwin P. Garfinkle

[57] ABSTRACT

A relay multiplexer for low level analog signals is disclosed. To provide a low cost system, inexpensive reed type relays are used. Such relays provide a high capacitive coupling from the relay contacts to the relay coil and thereby degrade the AC common mode rejection of the multiplexer. Common mode rejection is enhanced in accordance with the disclosure by (1) using an optical coupling to the relay switch and (2) slaving a floating relay power supply to the guard potential of the selected channel.

4 Claims, 3 Drawing Figures

HIGH COMMON MODE RELAY MULTIPLEXER

BACKGROUND OF THE INVENTION

One of the problems associated with relay multiplexing of low level analog signals is that the capacitance from the relay contacts to the coils tends to degrade the AC common mode rejection of the multiplexer. In a typical multi-channel prior art relay multiplexer, each channel has high and low signal input lines and a guard line. Normally the contacts of the relay are electrostatically shielded from the relay coil. The function of the guard line is to provide an electrostatic shield for the high and low signal inputs. When the electrostatic shield is driven by the guard, the effective capacitance between the relay contacts and associated coil is minimized. However, in spite of the electrostatic shield, the capacitance of a typical relay from the open contact to the coil may be as much as 2 picofarads and the capacitance from the closed contacts to the coil may be as much as 4 picofarads. Also, in the conventional case, the ground at the signal source and the ground at the relay multiplexer may be separated by some distance and therefore there may be an AC difference in potential between the two grounds due to magnetically induced voltages or ground current flow. This difference in ground potentials is normally referred to as a common mode signal. This invention provides a means for nullifying the effect of the capacitance between each coil and its associated relay contacts.

DESCRIPTION OF THE PRIOR ART

Figure 1:
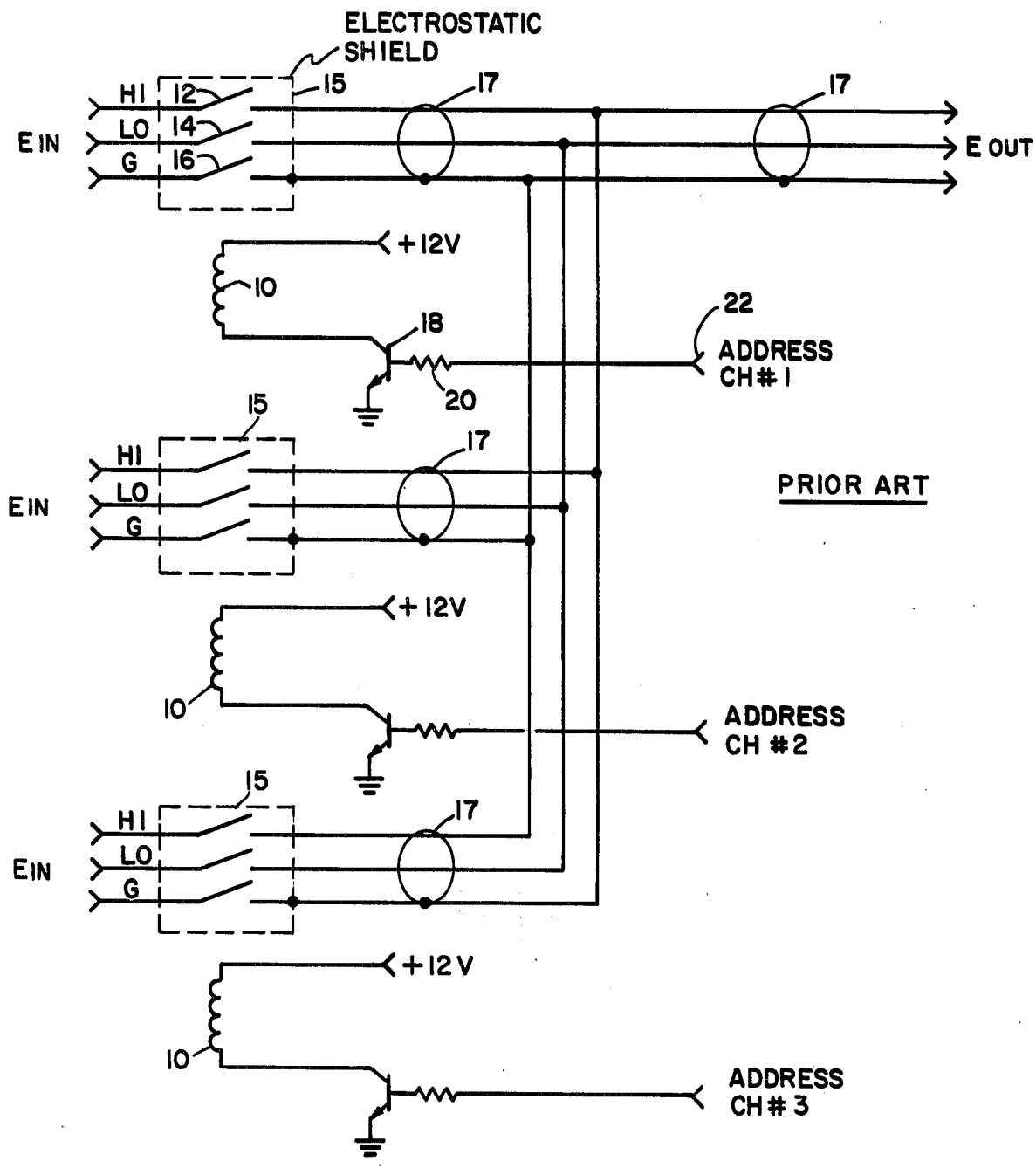
FIG. 1 is a schematic representation of a conventional prior art relay multiplexer.

The prior art relay multiplexer shown in FIG. 1 is a three-channel system, each channel using a relay having a coil 10 and three associated contacts 12, 14 and 16 connecting the high, low and guard lines HI, LO and G, respectively, from the signal input side $E_{in}$ to the signal output side $E_{out}$. In a conventional system, the relay contacts 12, 14 and 16 are electrostatically shielded by shield 15 and the input guard line G provides an electrostatic shield 17 for the high and low signal input lines. Power for the selected relay coil is provided by a 12-volt battery supply connected to ground through a coil 10 and a switching transistor 18. The transistor 18 is switched on or off through an impedance 20 by means of an appropriate address signal applied at a respective address input 22.

Figure 2:
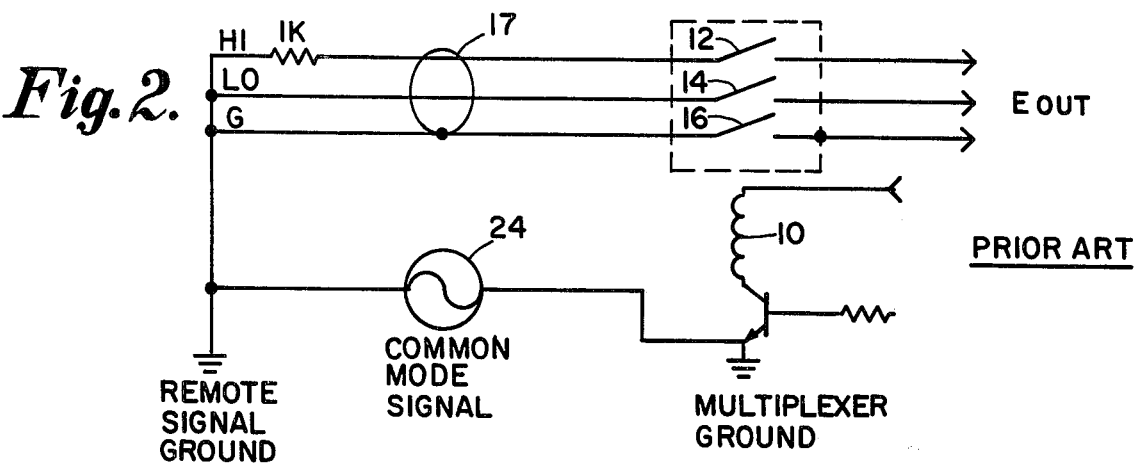
FIG. 2 is a schematic representation illustrating operation of a multiplexer of the type shown in FIG. 1.

When the electrostatic shield 15 is driven by the guard line G, the effective capacitance between the relay contacts and their associated coil is minimized. However, in spite of the electrostatic shield, the capacitance of a typical relay from the open contact to coil may be as much as 2 picofarads and the capacitance from the closed contact to the coil may be as much as 4 picofarads. A typical multiplexer application is illustrated in FIG. 2 where the signal input to a channel has an unbalanced source impedance of 1,000 ohms, the guard line G is connected to the low side of the signal and to ground at the signal source. Since the ground at the signal source and the local ground of the relay multiplexer may be separated by some distance, the possibility exists for an AC difference in potential between the two grounds due to magnetically induced voltages or ground current flow. This difference in ground potential is normally referred to as a common mode signal and as depicted in FIG. 2 may be regarded as a generator between the two grounds.

Thus, as seen in FIG. 2, the low side of the line is driven directly by the common mode generator 24, while the high side of the line is driven through a 1,000 ohm impedance. Therefore, any capacitance from the high side of the line to a fixed potential will serve to attenuate the AC common mode signal, while a similar value of capacitance from the low side of the line will produce negligible attenuation. We thus derive a normal mode signal from the difference between the signal on the high and low relay inputs.

A commonly used figure of merit for a differential multiplexer is the ability to provide 120 db common mode rejection of a 60 Hz signal with a 1,000 ohm source unbalance. To meet this requirement in a relay multiplexer, the total capacitance from either the high or low input lines to the relay coil must not exceed 3 picofarads. In the system as shown in FIG. 1 having only three channels and having only 2 picofarads from open contact to coil and 4 picofarads from closed contact to the coil, the amount of capacitance from the high or low line of any selected channel to the coil will be approximately 8 picofarads (the sum of the capacitance of the open and closed relays), thus, degrading the common mode rejection of even a three-channel multiplexer to significantly less than 120 db.

Figure 3:
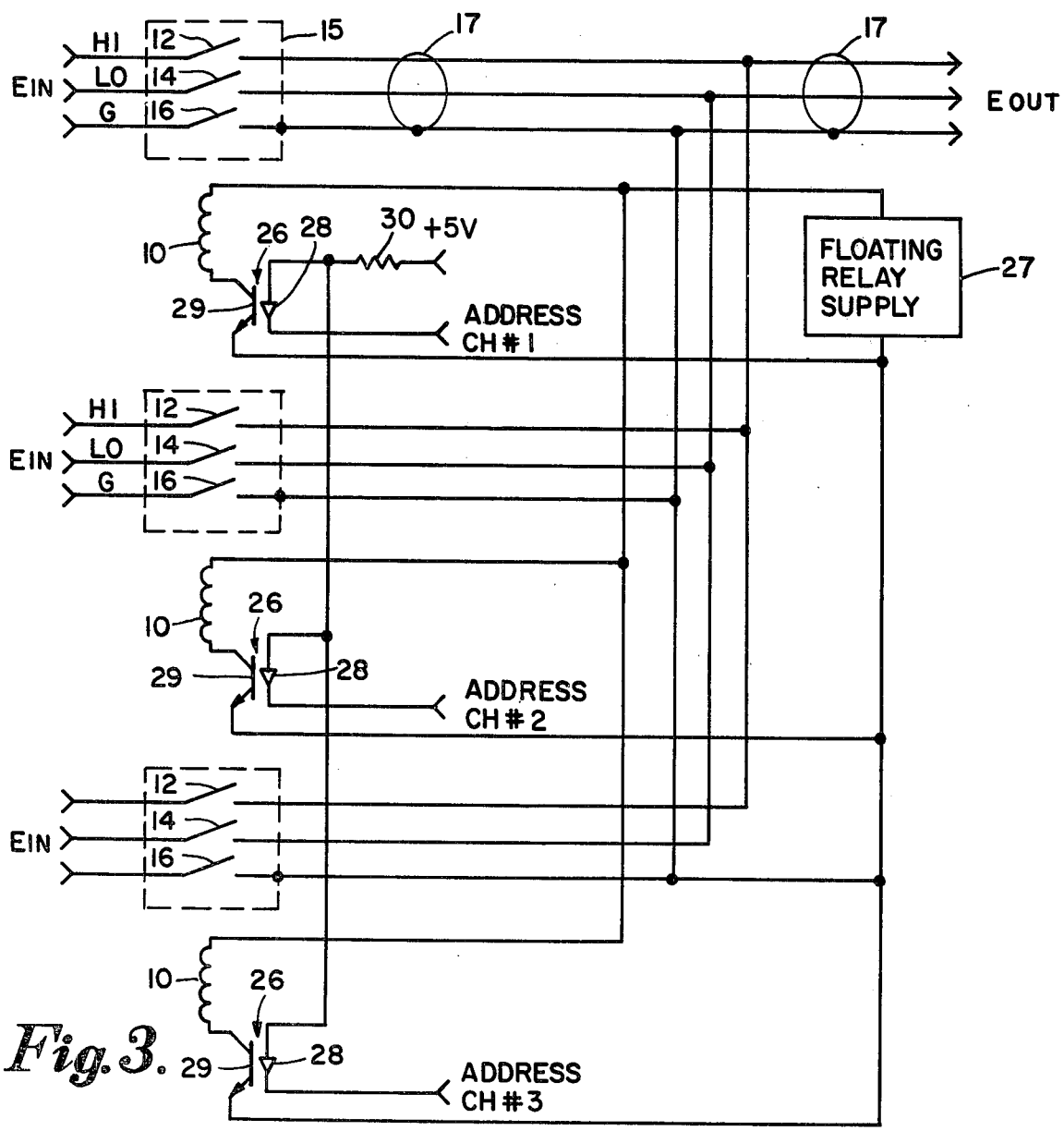
FIG. 3 is a schematic representation of a multiplexer made in accordance with this invention.

Description of Invention as Disclosed In FIG. 3

The embodiment of the invention disclosed in FIG. 3 provides a means for nullifying the effect of capacitance between the relay contacts and the coil. The embodiment in FIG. 3 is a three-channel system, each channel having a high line, a low line and a guard line G connecting the signal input $E_{in}$ to the signal output $E_{out}$ through the relay contacts 12, 14 and 16 respectively. As in the prior art, the selected contacts are actuated by supplying energy to an associated relay coil 10. As before, the signal lines are shielded by means of an electrostatic shield 17. Because of the inventive concept utilized herein, the electrostatic shield 15 shown in FIG. 1 may be eliminated.

Energy for all of the relay coils is provided by means of a floating 12-volt relay supply 27 connected in series with the respective coils 10 through an optical isolator 26. The optical isolator includes a phototransistor 29 optically coupled to a light-emitting diode 28. The optical isolator actually used in the circuitry as reduced to practice was a Litronix IL-74. The selected isolator 26 is turned on or off by means of an address signal applied through light-emitting diode 28 from a 5-volt supply through a resistor 30. The particular light-emitting diode is selected by an address signal applied to a particular channel, #1, #2 or #3.

It will be observed that the floating relay supply 27 is not grounded and is therefore isolated. The activation of a particular relay is accomplished by optically coupling the light-emitting diode 28 to the phototransistor 29, and the particular isolator is selected by a digital channel select command at address channel #1, #2 or #3. It will be noted that the output guard line G is connected to one side of the 12-volt floating relay supply 27 and the supply 27 is thereby slaved to the guard potential of the selected channel.

Comparing the invention as shown in FIG. 3 to the prior art as shown in FIGS. 1 and 2, it will be observed that the capacitance between the various contacts of the coils remains the same, namely, about 4 picofarads from the closed contacts and 2 picofarads from the open contacts to the coil. However, the effect of this capacitance is essentially reduced to zero because the coils of all the relays are driven at the same AC potential. While the electrostatic shield 17 is still required to shield the signal lines, in some circumstances the electrostatic shield 15 may be eliminated to further reduce the cost of the relay.

This invention is particularly important with respect to multiplexers that employ reed relays. In the prior art arrangement of FIG. 1, the coils of the relays are at ground potential of the console where the signals are being measured. Since there is capacitance between the contacts and the coils of the various relays, the common mode signal represents the differences in the potentials between the ground of the signal source and the console ground.

As illustrated in FIG. 2, when current flows through the 1 K resistance in the high signal line, it will create a voltage drop, whereas virtually no voltage drop takes place in the other signal lines. In accordance with this invention, the guard line is used to drive the relay coil at the same potential as the normal mode signal that is on the contact. Now since the coil and the contacts are at the same potential, there will be no current flow flowing through the capacitances between the contacts and the coil. Therefore, there will be no voltage drop through the 1 K resistor, and therefore the common mode is not converted to a differential signal.

The purpose of the optical coupler is to enable the coil to be driven at a potential which may be several hundred or even a thousand volts. The coil can be driven at a high voltage, whereas the light-emitting source of the optical coupler is driven from the console reference which may be a 5-volt supply. This permits the isolation between the coil voltage and the system voltage supply.

In a multiplexer of the type disclosed, there will be one channel with closed relay contacts paralleled by a number of channels with open contacts. In the case illustrated, there are only three channels. With more channels, the problem is worse since the parallel capacitances add. But since the selected guard drives the floating power supply, the coils of all of the relays are driven by the common mode signal of the selected channel thereby eliminating the effect of the capacitance between the selected channels and all of the relay coils.

This invention is particularly important with respect to multiplexers that employ reed relays since it is difficult and expensive to build a reed relay in such a way that the coil is not in proximity to the contacts. The normal fabrication procedure involves wrapping of the reed switches with a foil for an electrostatic shield, then wrapping the coil around a bobbin into which the shielded reed switches are inserted. Due to the inherent need for the coil to be in proximity to the reeds, capacitance from coil to contacts of less than a few picofarads is virtually unattainable. In the construction of relays other than the reed type, capacitance between contacts and coil of less than 2 picofarads is achievable by controlling a mechanical linkage such that the coil is not in proximity to the contacts, but a relay so constructed may be expected to be physically larger than the type of reed relay normally used for signal switching.

This invention enables the use of small reliable reed relays for signal multiplexing without the inherent degradation of common mode rejection that results from capacitance between the relay coils and their associated contacts, but the philosophy described should not be considered as being restricted to reed relays exclusively.

I claim:

1. In a multiplexer having a plurality of signal channels, each of said channels having a plurality of signal lines, said lines including a high signal line, a low signal line and a guard line, a relay for each of said channels, said relays each having contacts connecting the signal input terminals of each line to its signal output terminal, each of said relays including a coil for actuating said contacts, the combination comprising:
    a floating voltage supply;
    an electronic switch connecting said supply across each of said coils;
    channel selecting means for closing a selected switch;
    the signal output side of each of said guard lines being interconnected;
    a connection between one side of said supply and the output side of said interconnected guard lines;
    the signal output side of each of said high signal lines being interconnected; and
    the signal output side of each of the said low signal lines being interconnected.

2. The invention as defined in claim 1 wherein each of said switches is an optical coupler.

3. The invention as defined in claim 2 wherein said optical coupler includes a light sensitive transistor.

4. The invention as defined in claim 3 wherein said channel selecting means comprises a light-emitting diode in optical proximity to said light sensitive transistor.

* * * * *